Sept. 8, 1942.    J. T. RYAN ET AL    2,295,357
TURNBUCKLE ASSEMBLY
Filed Oct. 15, 1940
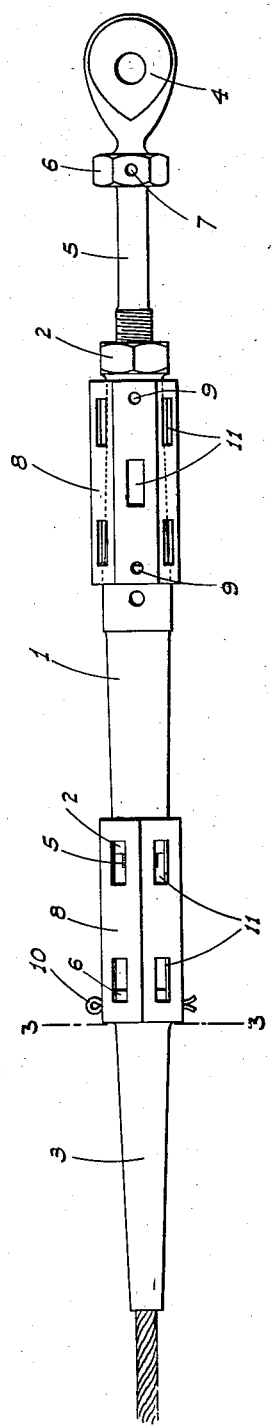
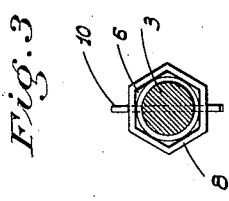
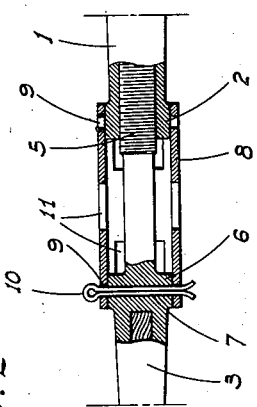
INVENTORS
Jas. T. Ryan &
BY  Homer Robinett
ATTORNEYS Patented Sept. 8, 1942

2,295,357

UNITED STATES PATENT OFFICE 2,295,357

TURNBUCKLE ASSEMBLY

James T. Ryan, Santa Monica, and Homer Robinett, Los Angeles, Calif.

Application October 15, 1940, Serial No. 361,259

2 Claims. (Cl. 287—60)

This invention relates to a turnbuckle, and particularly to one of particular value in an airplane, in which an exact setting and subsequent holding of the various turnbuckles is extremely important.

The principal object of our invention is to provide a turnbuckle so constructed that either relatively movable end member thereof may be quickly and securely locked against movement when once set or adjusted to the desired position and at any point within one-sixth of a turn of said member.

The locking device includes a sleeve engaging and extending between the end of the turnbuckle body and a portion of the end member beyond the threaded stem thereof, and a further object of our invention is to construct this sleeve in such a manner that even after it is in place, an inspection as to the number of stem threads exposed beyond the body may be made so that army and navy regulations in this respect may be met. The sleeve is also arranged so that if not more than the allowed number of threads is exposed, a feeling inspection will give evidence of this even in the dark.

The turnbuckle is also constructed so that its body may be conveniently rotated with an ordinary wrench instead of by means of a pin projected through the center of the body as must be done at present.

Further, the safety locking feature of this turnbuckle can be set or operated in less than a quarter of the time now required for a similar operation.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is an elevation of our improved turnbuckle, showing one locking sleeve in locking position and the other one retracted to allow the adjacent end member to be adjusted.

Figure 2 is a fragmentary longitudinal section of the device, showing a sleeve as locked in position.

Figure 3 is a transverse section on line 3—3 of Fig. 1.

Referring now more particularly to the characters of reference on the drawing, the turnbuckle body 1, which is tapped right and left hand from its opposite ends as usual, is formed at said ends with slightly enlarged hexagonal heads 2.

The end members, whether of the swage type as at 3 or the eye or similar type as shown at 4, each have a threaded stem 5 to adjustably screw into the body. Also each member, at the base of the stem, is formed with a hexagonal head 6 the same size as heads 2; said head 6 having a hole 7 therethrough for a cotter pin or wire.

Slidable on each head 2 is a sleeve 8 of hexagonal form. The length of each sleeve is sufficient to extend between and engage adjacent heads 2 and 6 when stem 5 is in adjusted position, while the length of the body relative to both sleeves is such that both sleeves may be advanced onto the body clear of the heads 2, and the body being of smaller diameter than the heads, the sleeves may be rotated thereon.

Corresponding opposed faces of the sleeves, adjacent both ends, are provided with alined holes 9, those at the outer end of the sleeve being adapted to register with the hole 7 in the corresponding head 6 when the sleeve is disposed over said head; a cotter pin 10 or the like being then placed through the registering holes. The length of the sleeve is such relative to the two engaged heads when the allowed limit of threads (at the present time three) is exposed on the stem outside the body, that the inner end of the sleeve, when the latter is pinned to head 6, will lie flush with the inner end of head 2, as shown in Fig. 2. In this manner, a determination that no more than the allowed limit of threads is exposed may be made by feel. When the sleeve is thus engaged with both heads, it will be obvious that the end member cannot turn. The ability of the sleeve to be moved onto the body clear of head 2 enables the holes 9 in the same to be lined up with hole 7 in head 6 after the latter has been adjusted to position.

The purpose of placing holes 9 at both ends of the sleeves is to facilitate initial assembly, since it will be obvious that by so doing it is immaterial from which end the sleeves are slid onto the body.

In order to provide for a visual inspection of the exposed stem threads the sleeves are provided on all sides with openings 11 of suitable form and generous size, so that the inspector may readily see the threads through one or the other of the openings.

The heads 2 as well as the sleeves being hexagonal, they may be engaged to turn or hold the body, by any standard wrench of the proper size.

The openings 11 not only provide for inspection, as described, but also decrease the weight of the assembly—an important factor in airplane construction.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a turnbuckle which includes a body, an end member having a threaded stem adjustably screwed in and projecting from one end of the body and enlarged multisided symmetrical heads of identical form and size on the member and said end of the body, a sleeve non-turnably but slidably fitting the heads and of a length to extend between and overhang both heads when the end member is adjusted to position, and means for releasably locking the sleeve and body together against relative movement and operative only when said sleeve and the heads are in predetermined rotative relation; the body beyond its head being smaller than the head and of a greater length than the sleeve whereby the sleeve may be shifted onto the body clear of said head for unrestricted rotation and to expose the portion of the stem immediately adjacent said one end of the body.

2. In a turnbuckle which includes a body, an end member having a stem threaded from its outer end a predetermined distance and adjustably screwed in one end of the body whereby the stem projects longitudinally therefrom, there being a predetermined number of stem threads normally exposed beyond said one end of the body, enlarged non-circular heads of identical form and size on said member outwardly of said threaded portion of the stem, and on said end of the body, a sleeve non-turnably but slidably fitting the heads and of a length to extend between and overhang said heads when said member is adjusted to position, and means releasably securing the sleeve at one end in connection with the corresponding head and against relative longitudinal movement; the length of the sleeve being such that when said predetermined number of stem threads are exposed beyond said one end of the body and within the sleeve, the other end of the sleeve is disposed flush with the outer or exposed face of the other head whereby a determination that no more than said predetermined number of threads are exposed may be made by feel.

JAMES T. RYAN.
HOMER ROBINETT.